Figure 1:
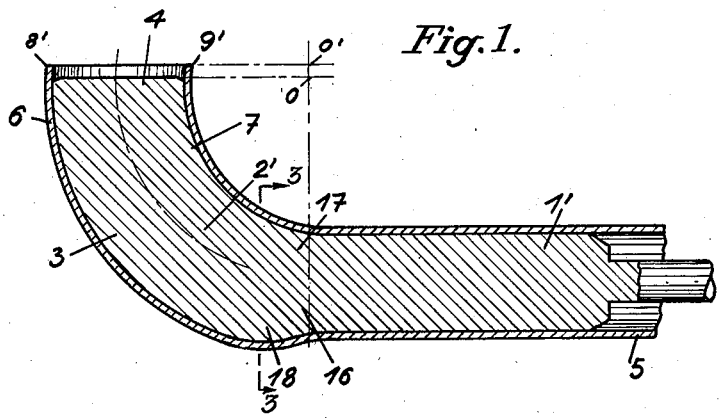

March 20, 1934.   R. H. BÖHLING   1,951,334
METHOD AND APPARATUS FOR MANUFACTURING PIPE BENDS AND THE LIKE
Filed March 8, 1932

Inventor
Rudolf Hieronymus Böhling
per
Clair W. Fairbank
atty

Patented Mar. 20, 1934

1,951,334

UNITED STATES PATENT OFFICE 1,951,334

METHOD AND APPARATUS FOR MANUFACTURING PIPE BENDS AND THE LIKE

Rudolf Hieronymus Böhling, Hamburg, Germany

Application March 8, 1932, Serial No. 597,437
In Germany March 27, 1931

12 Claims. (Cl. 153—32)

The invention relates to a method and apparatus for manufacturing pipe bends, serpentines and the like by means of a curved mandrel which is drawn through a straight pipe, or over which such pipe is forced, the shaped part of the mandrel being of such cross section that the cross section of the pipe is increased by the bending operation.

It is known to manufacture pipe bends in this way by means of a curved mandrel which has an eccentric expansion by means of which the pipe is expanded on the inner side of the curve so that the material of the pipe accumulating on the inside of the curve is made use of in enlarging the pipe. Such a method and mandrel are disclosed and claimed in my prior United States Patent No. 1,353,714.

Pipes have also been bent by driving them over a conical mandrel or a ball shaped head with consequent enlargement of the cross section. In this case the cross section of the pipe is expanded concentrically on all sides; the absence of a guide involves moreover the disadvantage that pipe bends with a definite curvature in a definite plane of curvature cannot be made in one operation.

In the known method with unilateral enlargement of the cross section on the inner side of the curve it has been found in view of the accumulation of the material of the pipe on the inside of the curve, the wall of the pipe on the outer side of the curve gains on the wall of the pipe on the inner side of the curve so that the ends of the pipe bends thus obtained are acute angled at the outer side of the curve. The gain of the outer wall of the bend is due to the greater frictional resistance occurring on the inner side of the curve. On cutting the pipe ends to form pipe bends of definite angle, for example 90° or 180°, with edges extending radially towards the centre of curvature these acute angled ends must be cut away. In this way a material wastage arises which detrimentally affects the economy of the method.

The essence of the present invention resides in that the gain of the pipe material on the outer side of the curve in the manufacture of pipe bends on a curved mandrel is counteracted in that not only is the enlargement effected eccentrically on the inner side of the curve but at the same time an enlargement of the pipe on the outer side is effected corresponding to the gain of the material of the pipe on the outer side of the curve, so that if necessary the pipe is enlarged concentrically.

This enlargement which may vary from eccentric to concentric enlargement of the pipe may be such as to produce an internal diameter smaller than or equal to the inner diameter of the pipe bend desired.

The gain of the pipe material on the outer side of the curve in the manufacture of pipe bends can be overcome in that the mandrel between its cylindrical part and the part for guiding the pipe bend is joined by a conical bridge piece. The inclination of the conical section to the outer side of the curve is to be such that the advance of the outer wall of the curve of the pipe corresponds to the advance of the material of the pipe on the inner side of the curve and the edges of the end of the pipe after bending lie approximately in the plane passing through the centre of curvature. Before bending, said ends were substantially at right angles to the axis of the blank. In this way only a very small wastage by trimming is obtained.

In the drawing there is shown the manufacture of pipe bends according to my improved method.

Figure 2:
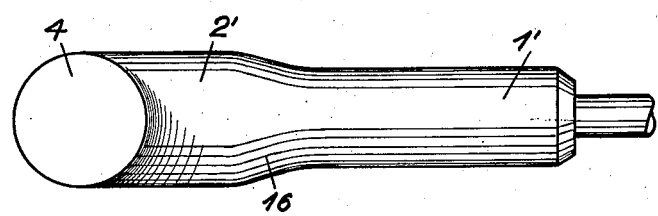
Figure 3:
Figure 4:
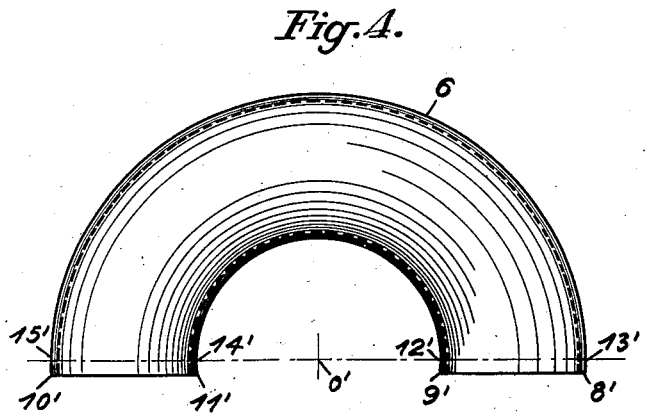

Fig. 1 is a longitudinal section through a mandrel and a partially formed pipe bend in accordance with the invention, Fig. 2 is a plan view of the mandrel of Fig. 1, Fig. 3 is a transverse section through the partially formed pipe bend taken on the line 3—3 of Fig. 1, the mandrel being omitted, and Fig. 4 shows a pipe bend prepared in accordance with the invention.

In contradistinction to the known method shown in my prior Patent 1,353,714 the enlargement of the pipe on passing it over the mandrel in accordance with the invention is so effected that in addition to the enlargement on the inner side of the curve, an enlargement is effected on the outer side of the curve also.

According to the invention the mandrel consists of a shaft 1' and an annular segmentary shaped portion 2' to which it is connected by means of a truncated conical member, for example an oblique truncated cone 16. In this way not only is an enlargement effected by the conical surface 17 lying on the inner side of the curve but also at the same time by the conical surface 18 lying on the outside of the curve. By reason of this oblique truncated conical section 16 the pipe is expanded radially in all directions in respect to the axis of the shaft or cylindrical portion 1' of the mandrel and the axis of the pipe blank encircling and slidable along said shaft portion. This conical surface on the outer side 18 of the curve has the effect of counteracting the gain of the material of the pipe on the outside of the curve as has long been noticed in the known methods. By appropriate choice of the inclination of the conical surface 18 disposed on the outer surface of the curve it can be attained in practice that the outer side of the curve of the pipe bend does not gain on the inner side of the curve so that the outer edge 8' together with the inner edge 9' lies on a plane 8', 9', 0' which passes substantially through the centre of curvature. On cutting or trimming the pipe bend the only waste involved is the small strips 8', 9', 12', 13' and 10', 11', 14', 15'. A further advantage of the invention has been found to reside in that the tendency of the mandrel to straighten which has been encountered in the previous processes either does not occur at all or else does not arise to the extent hitherto observed.

The enlargement of the pipe according to the invention is preferably such as to give a diameter smaller than or at the most equal to the internal diameter of the desired pipe bend i. e., the enlargement of the periphery of the tube should where possible not be greater than corresponds to the diameter of the completed pipe bend.

The invention enables considerable economy in raw material to be effected so that the known processes are superseded on economical grounds. The invention is of particular utility in pipe manufacturing bends of smaller radius.

I claim:

1. The method of manufacturing pipe bends, serpentines, and the like from a pipe blank, which includes the steps of expanding the pipe blank in all directions radially in respect to the axis of the pipe blank, and die drawing it into curved shape while holding it in expanded condition.

2. The method of manufacturing pipe bends, serpentines, and the like, which includes forcing a pipe blank over a mandrel portion to expand it in all directions radially in respect to the axis of the pipe blank, and then over a mandrel portion to curve the expanded blank.

3. The method of manufacturing pipe bends, serpentines and the like from a pipe blank having one end thereof in a plane substantially at right angles to the axis thereof, which includes the steps of forcing said blank over a mandrel with the said end in forward position, and thereby enlarging said pipe blank radially at its inner curved section to effect distribution of the metal from said inner curved section around the circumference of the pipe bend being formed, and retarding the advancement of the outer curved section of the pipe bend sufficiently so that the forward end of the pipe bend formed will lie substantially in a radial plane of the bend.

4. The method of manufacturing pipe bends, serpentines and the like, which includes the steps of forcing a pipe blank endwise over a mandrel acting to apply internal pressure to expand said blank in all directions radially in respect to the axis of the pipe blank and to bend the expanded blank to curved form, the expanding action on the outer curved section of the pipe bend being sufficient to retard advancement of this latter section so that the end of the pipe bend formed will lie substantially in a radial plane of the bend.

5. The method of manufacturing pipe bends, serpentines and the like by means of a mandrel, which consists in forcing a pipe blank over a cylindrical mandrel portion of the same diameter as the inner diameter of the blank, then over an enlargement acting to expand the blank in all directions radially in respect to the axis of the pipe blank, and then over an eccentric projection to bend the expanded portion to curved form.

6. The method of manufacturing pipe bends, serpentines and the like, which consists in forcing a pipe blank over a mandrel adapted to expand it in all directions radially in respect to the axis of the pipe blank, and then simultaneously bend and further expand the blank eccentrically to its longitudinal axis.

7. A pipe drawing mandrel including a cylindrical section, and an enlargement at one end of said section for bending a pipe blank moved thereover and for simultaneously expanding said pipe blank radially in respect to the axis of said cylindrical section at the inner and outer curved sections thereof.

8. A pipe drawing mandrel including a cylindrical member, and die means connected to one end of said member for bending a pipe blank drawn therealong, and for simultaneously enlarging said pipe blank in all directions radially in respect to the axis of the pipe blank.

9. A mandrel for making pipe bends, serpentines and the like, including a cylindrical section, a section flaring in all directions from one end of said cylindrical section and adapted to expand a pipe in all directions radially in respect to the axis of the pipe blank, and an arcuated section extending from the flared end of said second mentioned section and adapted to bend the expanded pipe blank when said blank is moved thereover.

10. A mandrel for making pipe bends, serpentines and the like, including a cylindrical section, a section substantially in the shape of a truncated cone diverging on all sides from one end of said cylindrical section, and an arcuate section extending from the base of said conical section.

11. A mandrel for making pipe bends, serpentines and the like, including a cylindrical section, and a section at one end of said cylindrical section having a curved portion for shaping a pipe blank drawn therealong into bent shape and having an outwardly projecting portion on the outer curved section thereof for retarding said pipe blank at its outer curved section during the drawing operation.

12. A pipe drawing mandrel including a cylindrical section, and die means connected to one end of said cylindrical section for bending a pipe blank drawn therealong into curved shape and for simultaneously expanding said pipe blank at the inner and outer curved sections to effect substantially equal distribution of the metal of the blank throughout the circumference of the pipe bend during drawing operation, said die means having a portion for retarding the advancement of the outer curved section of the pipe bend during the drawing operation.

RUDOLF HIERONYMUS BÖHLING.